United States Patent
Atkinson

(10) Patent No.: US 7,805,558 B2
(45) Date of Patent: Sep. 28, 2010

(54) METHOD AND SYSTEM OF CONTROLLING TRANSFER SPEED OF BUS TRANSACTIONS

(75) Inventor: Lee Atkinson, Taipei (TW)

(73) Assignee: Hewlett-Packard Development Company, L.P., Houston, TX (US)

(*) Notice: Subject to any disclaimer, the term of this patent is extended or adjusted under 35 U.S.C. 154(b) by 857 days.

(21) Appl. No.: 11/263,356

(22) Filed: Oct. 31, 2005

(65) Prior Publication Data

US 2007/0101041 A1     May 3, 2007

(51) Int. Cl.
    *G06F 13/36*     (2006.01)
(52) U.S. Cl. .................. 710/306; 701/310; 701/311
(58) Field of Classification Search .......... 710/306, 710/310, 311
    See application file for complete search history.

(56) References Cited

U.S. PATENT DOCUMENTS

| | | | |
|---|---|---|---|
| 5,517,671 A * | 5/1996 | Parks et al. ................ 710/40 |
| 5,742,832 A | 4/1998 | Buxton et al. | |
| 6,076,160 A | 6/2000 | Wisor | |
| 6,079,022 A * | 6/2000 | Young ........................ 713/300 |
| 6,140,850 A * | 10/2000 | Inoue ......................... 327/141 |
| 6,567,901 B1 * | 5/2003 | Neufeld ...................... 711/158 |
| 6,934,870 B1 | 8/2005 | Amos | |
| 7,171,508 B2 * | 1/2007 | Choi ........................... 710/307 |
| 2005/0120149 A1 * | 6/2005 | Skarpness .................... 710/29 |

* cited by examiner

*Primary Examiner*—Mark Rinehart
*Assistant Examiner*—Jeremy S Cerullo

(57) ABSTRACT

A method and system of controlling data transfer speed of bus transactions. At least some of the illustrative embodiments are methods comprising analyzing of a characteristic a first bus transaction that has yet to be applied to a bus, setting a first data transfer speed across the bus based on the characteristic of the first bus transaction, and sending the first bus transaction across the bus at the first data transfer speed.

6 Claims, 3 Drawing Sheets

METHOD AND SYSTEM OF CONTROLLING TRANSFER SPEED OF BUS TRANSACTIONS

CROSS-REFERENCE TO RELATED APPLICATIONS

This specification is related to the specification of application Ser. No. 11/263,663 filed, Oct. 31, 2005, and titled, "A Method And System Of Controlling Data Transfer Speed And Power Consumption Of A Bus."

BACKGROUND

Significant power is consumed in data buses operating at high frequency, particularly buses that use Series Stub Terminated Logic (SSTL) signaling and/or Thevenin terminations for impedance matching. When consumed power needs to be reduced, or when internal computer or particular device temperatures get too high, power consumption (and therefore heat generation) may be reduced by slowing data transfer by lowering the frequency of the clock signal applied to the phase-locked loops of the source and target devices.

However, because clock signals couple to the source and target devices by way of phase-locked loops, lowering the frequency of the clock signal causes the phase-locked loops to lose lock and thus forces them to re-lock, a process that may take several clock cycles. For this reason, power consumption and clock frequency are controlled at a macro scale, based on system temperature, device temperature, and/or overall data throughput of a plurality of bus transactions.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

The various embodiments of the invention were developed in the context of controlling data transfer speed, and thus modifying power consumption mode, with respect to a memory bus and memory device. Thus, the following description is related to the developmental context. However, the techniques and systems described are applicable to any bus, serial or parallel, synchronous or asynchronous, and thus the developmental context and the related description should not be viewed as a limitation as to the applicability of the various embodiments.

Figure 1:
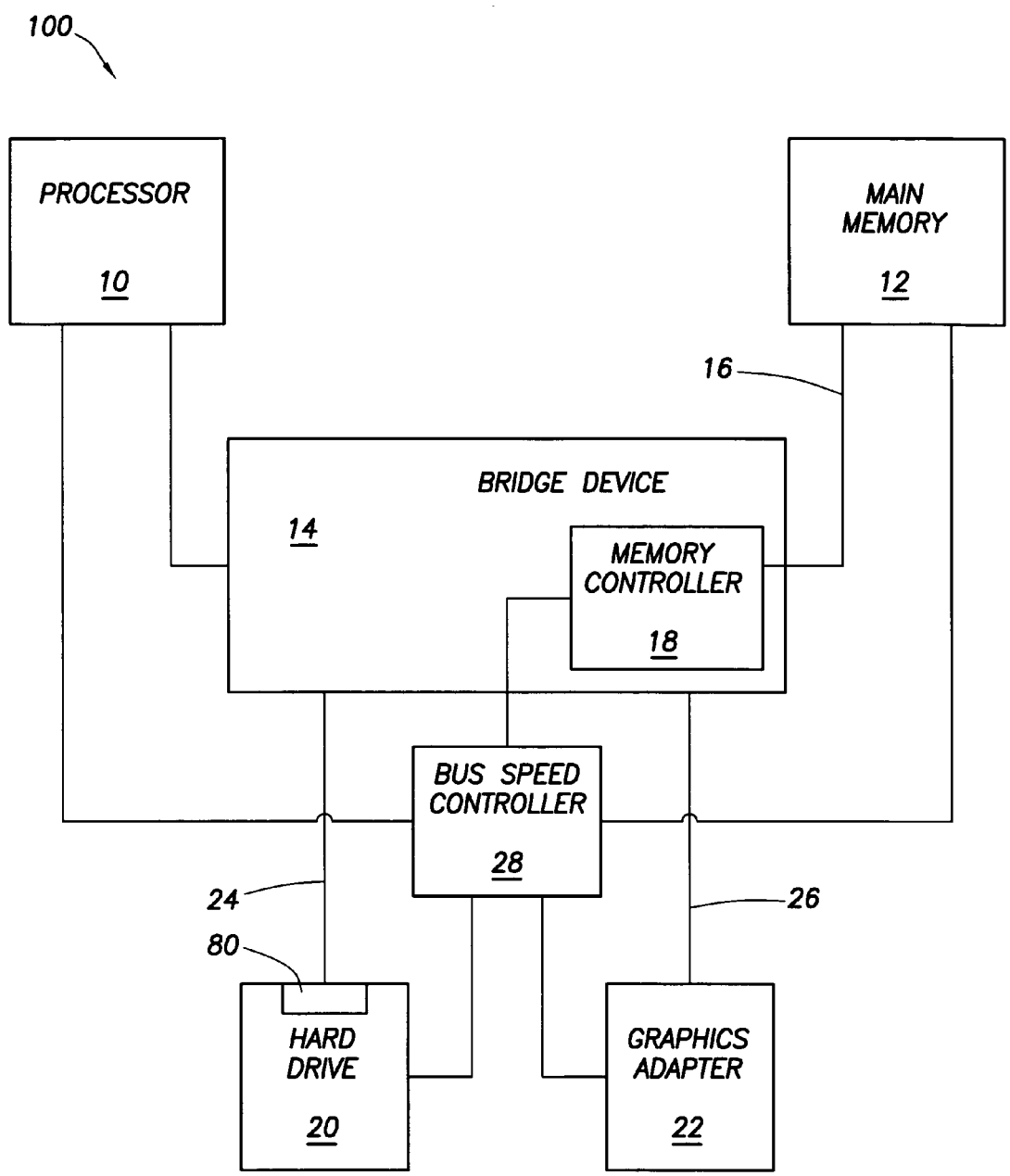
FIG. 1 shows a computer system in accordance with embodiments of the invention.

FIG. 1 illustrates a computer system 100 in accordance with at least some embodiments of the invention. In particular, computer system 100 comprises at least one CPU or processor 10. In alternative embodiments the computer system 100 comprises multiple processors arranged in a configuration where parallel computing may take place. The processor 10 couples to a main memory array 12 and a variety of other peripheral computer system components through a bridge logic device or bridge device 14. The main memory array 12 couples to the bridge device 14 through a memory bus 16, and the bridge device 14 comprises a memory control unit 18. The main memory 12 functions as the working memory for the processor 10 and comprises a memory device or array of memory devices in which program instructions and data are stored. The main memory array 12 may comprise any suitable type of memory such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

The bridge device 14 further couples the processor 10 and main memory 12 to other devices, like a hard drive 20 and graphics adapter 22. The hard drive 20 and graphics adapter 22 may couple to the bridge by way of secondary expansion buses 24 and 26, respectively.

Program threads executing on processor 10 may read and write data to the main memory 12 across memory bus 16. Likewise, illustrative peripheral devices such as hard drive 20 and graphics adapter 22 may read and write data to the main memory 12 across the memory bus 16, such as by direct memory access (DMA) techniques. Regardless of the source of the memory bus transactions targeting the main memory 12, those bus transaction are sent to memory controller 18, which controls transactions to the main memory 12 by asserting control signals during memory accesses, driving address signals and driving and/or reading data signals on the data lines of the memory bus 16.

In accordance with embodiments of the invention, the computer system 100 controls data transfer speed, and therefore power consumption, on the memory bus 16 on a bus transaction-by-bus transaction basis. In particular, computer system 100 comprises a bus speed controller logic 28 that couples to various computer system components to make decisions regarding the speed of a particular bus transaction (discussed more thoroughly below), and setting the data transfer speed selected. The bus speed controller 28 may be an application specific integrated circuit (ASIC) programmed to make determinations of bus speed and commands the physical mechanisms that implement bus speeds changes. Alternatively, the bus speed controller 28 could be a microcontroller or processor executing software to make determinations of bus speed and command the physical mechanisms that implement bus speeds. One possible physical mechanism of changing data transfer speed for each particular bus transaction is discussed with respect to FIG. 2.

Figure 2:
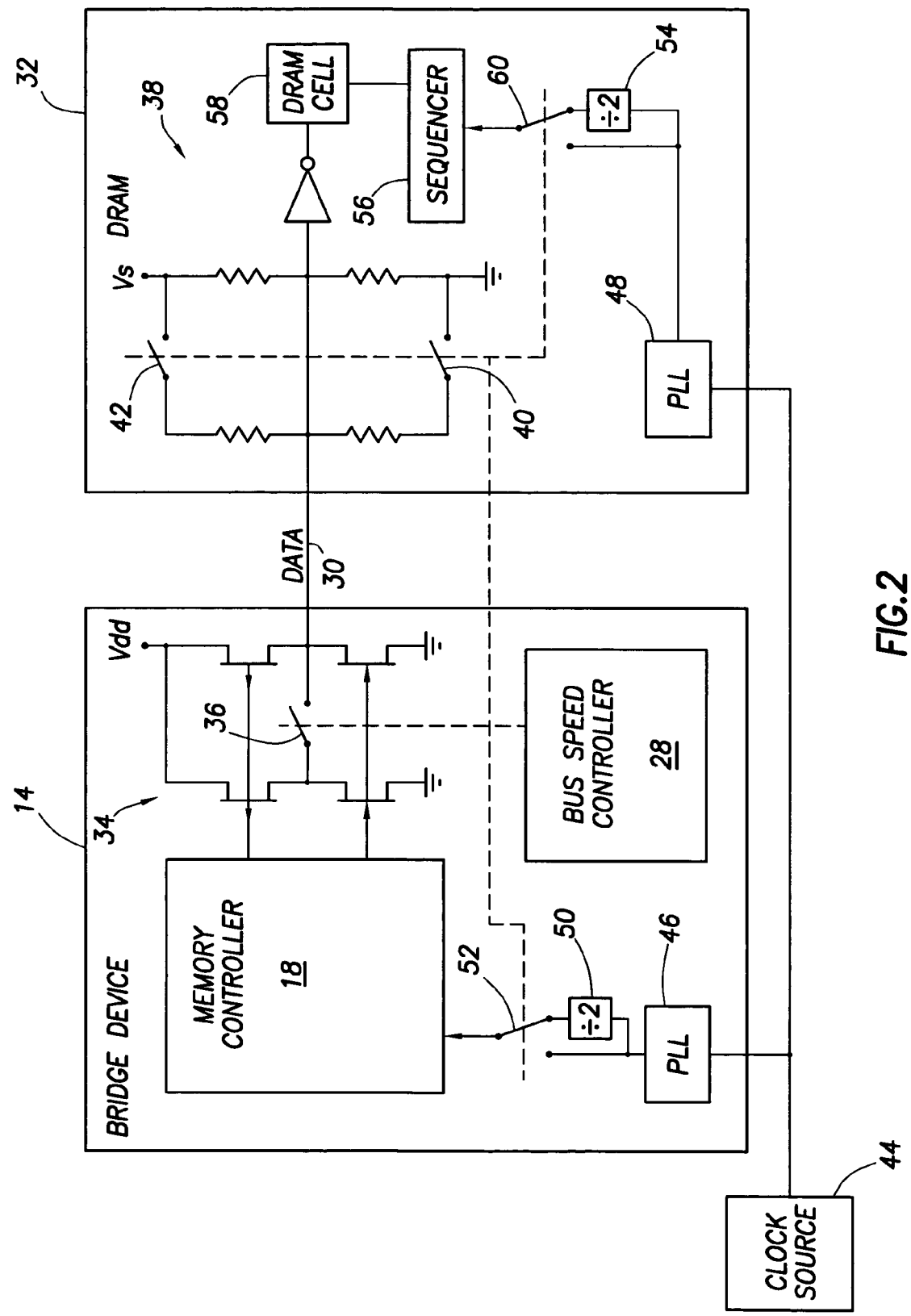
FIG. 2 shows a single data line of a data bus coupling a bridge device to a DRAM device in accordance with embodiments of the invention.

FIG. 2 illustrates a single data line coupling the bridge device 14 to a DRAM device 32, which DRAM device may be a portion of the main memory 12 (FIG. 1). In accordance with at least some embodiments, the DRAM is a DDR-2 DRAM available from Micron Inc. Although DRAM has many address and data lines, only one data line is shown so as not to unduly complicate the figure. Moreover, the illustration of FIG. 2 shows a configuration for data transfer from the bridge device 14 to the DRAM 32, but data transfer from the DRAM device 32 to the bridge device 14 is also contemplated. FIG. 2 also illustrates that the bus speed controller 28 need not be external to the bridge device 14, and thus may be incorporated within the bridge device 14, and optionally within the memory controller 18.

The memory controller 18 couples to the data bus 30 by way of a set of interface drivers 34. In situations where low drive impedance is desired (e.g., at faster data transfer speeds), switch 36 closes such that each push-pull configuration of transistors (as illustrated field-effect transistors) operate in parallel, thus lowering drive impedance. In situations where high drive impedance is desired (e.g., at slower data transfer speeds), switch 36 opens so that only one set of push-pull configuration transistors is coupled to the data line 30. On the target device side, the data line terminates in a termination or resistor network 38 comprising two switches 40 and 42. In situations where low termination impedance is desired (e.g., at faster data transfer speeds), switches 40 and 42 are closed thus paralleling the resistors coupled to ground, and paralleling the resistors coupled to the voltage source (Vs). In situations where high termination impedance is desired (e.g., at slower data transfer speeds), switches 40 and 42 are opened, breaking the parallel configuration. In accordance with at least some embodiments, each resistor is a 150 ohm resistor, and thus when coupled in parallel the two resistors provide an impedance of approximately 75 ohms. In situations where the resistor network and interface driver impedance is low, making the overall performance more responsive, significant power may be used which generates heat. In situations where the resistor network and interface driver impedance is high, slowing overall performance, less power is consumed.

A clock source 44 couples a clock signal to both the bridge device 14 and the DRAM 32. Within the bridge device 14, the clock signal couples to a phase-locked loop 46 device. Likewise within the DRAM 32, the clock signal couples to a phase-locked loop 48. In accordance with embodiments of the invention, and in some modes of operation, each of the memory controller 18 and DRAM 32 are configured to perform data operations on each rising and falling edge of the clock signal, which is known as double-edge triggered clocking. When the memory controller 18 and DRAM 32 are operating based on the rising and falling edges of the unmodified clock signal, the illustrative system is operating in the faster data transfer speed. Embodiments of the invention also implement a slower data transfer speed, but this slower data transfer mode is accomplished without changing the frequency of the clock signal supplied from the clock source. By not changing the frequency of the clock signal from the clock source, the phase-locked loops 46 and 48 do not lose the phase lock, and thus do not need to re-lock. Re-lock operations may take several clock cycles.

Still referring to FIG. 2, to implement the slower data transfer speed in accordance with embodiments of the invention, the output signal of the phase-locked loop 46 selective couples to the memory controller through a divide-by-2 circuit 50 by operation of switch 52. Likewise, the output signal of phase-locked loop 48 selective couples to the DRAM sequencer 56 (and thus DRAM cell 58) though a divide-by-2 circuit 54 by operation of switch 60. Switches 52 and 60, as well as switch 36 in the interface drivers 34 and switches 40 and 42 of the resistor network 38, are controlled by the bus speed controller 28.

Once determining that a particular bus transaction should operate at a particular data transfer speed, the bus speed controller selects switch positions of all the switches to implement the desired speed. For the slower data transfer speed, the bus controller 28 effectively implements single-edge triggered clocking (relative to the clock signal from the clock source 44), utilizing the divide-by-2 circuits 50 and 54. Also in the slower data transfer speed, bus speed controller 28 increases drive impedance (opens switch 36) and increases termination impedance (opens switches 40 and 42). For the faster data transfer speed, the bus controller 28 implements double-edge trigger clocking by having the output clock signals of the phase-locked loops 46 and 48 bypass the divide-by-2 circuits 50 and 54, respectively. Having the ability to quickly switch from a double-edge triggered to single-edge triggered system enables setting bus transfer speeds (and therefore power consumption), on a bus transaction-by-bus transaction basis. Switching between the faster and slower data transfer may thus take place in the longest of the switch operating time of the various switches, which in some embodiments may be within one clock cycle or shorter.

Having now described an illustrative physical mechanism to switch between the faster data transfer speeds and the slower data transfer speeds, attention now turns to the basis for deciding the transfer speed (and power consumption) of a particular bus transaction. In accordance with embodiments of the invention, the transfer speed for a particular bus transaction is based on one or both of a characteristic of the bus transaction itself, or a characteristic of the source device of the bus transaction. Each of these is discussed in turn, starting with characteristics of bus transactions.

In at least some embodiments, the bus speed controller 28 may set transfer speed for a particular bus transaction based whether that bus transaction is a read or a write transaction. For the illustrative situation of a data bus between a memory controller and a main memory, read transactions may be operated at the faster data transfer speed as there is a possibility that a source device has stalled waiting for the data. In yet other embodiments, the transfer speed for a particular bus transaction may be based on whether the bus transaction targets a particular memory area of the target device. Thus, read or write transactions directed to a particular memory area (e.g., that memory area assigned to an important program, or the processor itself), may be implemented at the faster data transfer speed, and bus transactions outside the predetermined area may be implemented at the slower data transfer speeds.

In addition to, or in place of, making data transfer speed determinations based on characteristics of the bus transaction itself, characteristics of the source device of the bus transaction may be considered. Returning briefly to FIG. 1, any of the illustrative processor 10, hard drive 24, graphics adapter 22, or any device capable of direct memory access, may initiate bus transactions across the memory bus 16 to the main memory 12. Priorities may be assigned for each device. For example, bus transactions sourced by the processor 10 and/or hard drive 20 may be set for the faster data transfer speed, while refresh transactions of the graphics adapter 22 may be set for the slower data transfer speed. By contrast, data reads by the graphics adapter 22 for 3D rendering may be set for the faster data transfer speed.

Further with regard to characteristics of the source device, internal operational characteristics may also be considered when setting a data transfer speed for a particular bus transaction. Consider processor 10 issuing a speculative cache line read. In some embodiments, speculative cache line reads, which may not ultimately be used, are set at the slower data transfer speeds. By contrast, reads issued by processor 10 where a thread executing in the processor has stalled waiting for the data are set at the faster data transfer speeds. Further still, each thread executing within the processor may be given different priority, such that a bus transaction triggered by one thread from the processor set at the faster data transfer speed, and a bus transaction triggered by a second thread is set at the slower data transfer speed.

Further with regard to characteristics of the source device, and in particular internal operational characteristics, consider hard drive 20 having a transaction buffer 80 therein storing bus transactions destined for the main memory 12. At first, the bus transactions across the memory bus 16 may operate at the slower data transfer speed, but as buffer 80 starts to fill (in the case of writes) or empty (in the case of reads), the bus controller 28 may set the illustrative hard drive's bus transactions for the faster data transfer speed. Likewise for the hard drive 20, or any device, that makes long fetches of data, the first portion of the long fetch (presumably when the source device is starved for the data), the bus controller 28 may set the data transfer speed for the bus transactions at the faster data transfer speed. After the first portion of the long fetch has completed (and presumably the source device is no longer starved for data), the bus controller 28 may set the slower data transfer speed for the remaining portion of the long fetch.

Figure 3:
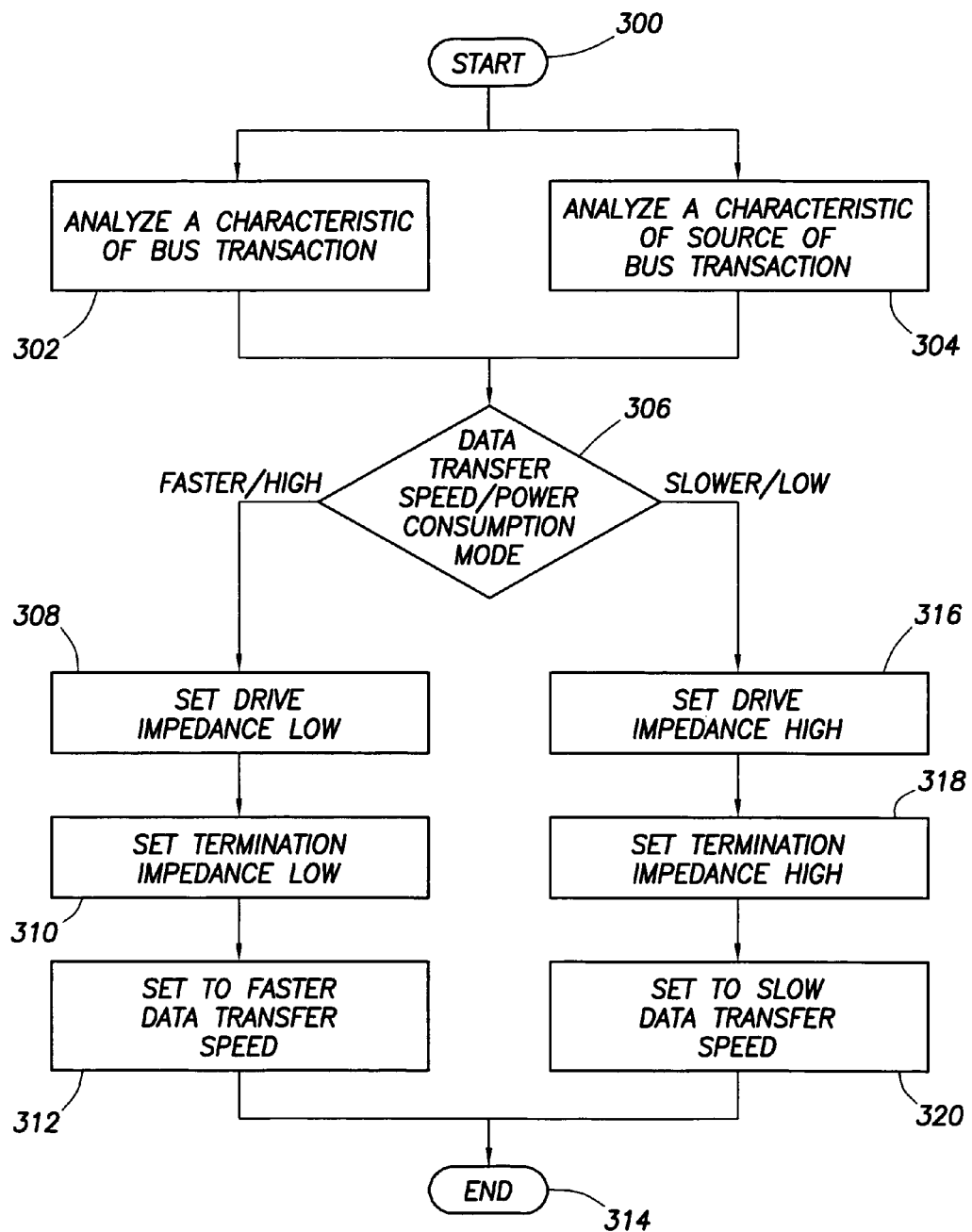
FIG. 3 shows a method in accordance with embodiments of the invention.

FIG. 3 illustrates a method in accordance with embodiments of the invention, which in some embodiments is implemented in the bus controller 28. Some or all of the various illustrative functions may be combined, separated and/or performed in a different order without departing from the scope and spirit. In particular, the process starts (block 300) upon creation of a bus transaction and proceeds to one or both of analyzing a characteristic of the bus transaction (block 302) or analyzing a characteristic of the source device of the bus transaction (block 304). Thereafter, a determination is made as to whether the bus transaction should have a faster data transfer speed (higher power consumption) or a slower data transfer speed (lower power consumption) (block 306). If the bus transaction is set for a faster data transfer speed, the drive impedance is lowered (block 308) (such as by closing switch 36 thereby effectively adding a push-pull pair of the interface drivers 34), the termination impedance is set low (block 310), and the actual data transfer speed is set to faster speed (block 312) (such as by setting double-edge triggered clocking). Thereafter, the process ends (block 314), to be restarted for the next bus transaction.

Still referring to FIG. 3, and in particular the determination of whether the bus transaction should have a faster data transfer speed or a slower data transfer speed (again block 306), if the bus transaction is set for the slower data transfer speed, the drive impedance is set high (block 316) (such as by opening switch 36 thereby effectively removing a push-pull pair of the interface drivers 34), the termination impedance is set high (block 318), and the actual data transfer speed is set to the slower speed (block 320) (such as by setting single-edge triggered clocking). Thereafter, the process ends (block 314), to be restarted for the next bus transaction.

What is claimed is:

1. A method comprising:
analyzing a characteristic of a first source device to determine a state of the first source device's transaction buffer, the first source device provides a first bus transaction;
setting, as between a fast transfer speed and a slow transfer speed, a data transfer speed across a bus at the fast transfer if the transaction buffer is substantially full; and
sending the first bus transaction across the bus at the fast transfer speed.

2. The method as defined in claim 1 further comprising:
analyzing a characteristic of a second source device of a second bus transaction, and which second bus transaction immediately follows the first bus transaction, and the characteristic of the second source device unrelated to the content of the second bus transaction;
setting a second data transfer speed across the bus based on the characteristic of the second source device; and
sending the second bus transaction across the bus at the second data transfer speed.

3. The method as defined in claim 2 further comprising:
wherein analyzing a characteristic of the second source device further comprises determining a priority of the second source device in relation to other source devices; and
wherein setting the second data transfer rate further comprises setting, as between a fast transfer speed and a slow transfer speed, the data transfer speed at the fast transfer speed for the second bus transaction of the second source device.

4. The method as defined in claim 2 further comprises:
wherein analyzing a characteristic of the second source device further comprises determining whether the second bus transaction is a speculative read; and
wherein setting the second data transfer rate further comprises setting, as between a fast transfer speed and a slow transfer speed, the data transfer speed at the slow transfer speed if the second bus transaction is a speculative read.

5. A system comprising:
a processor;
a memory controller coupled to the processor by way of a processor bus;
a memory coupled to the memory controller by way of a memory bus, wherein the memory bus is configured to operate at a first clock frequency and a second clock frequency, the second clock frequency slower than the first clock frequency;
wherein the memory controller is configured to receive a bus transaction targeting the memory, and before sending the bus transaction the memory controller is configured to select a memory bus clock frequency based on a state of a transaction buffer of a first source device that sent the bus transaction to the memory controller.

6. The system as in claim 5 wherein memory controller selects the first clock frequency when the transaction buffer of the first device is substantially full.

* * * * *